(12) United States Patent
Liu et al.

(10) Patent No.: US 11,443,228 B2
(45) Date of Patent: Sep. 13, 2022

(54) JOB MERGING FOR MACHINE AND DEEP LEARNING HYPERPARAMETER TUNING

(71) Applicant: INTERNATIONAL BUSINESS MACHINES CORPORATION, Armonk, NY (US)

(72) Inventors: Junfeng Liu, Markham (CA); Kuan Feng, Thornhill (CA); Zhichao Su, Chang Ping (CN); Yi Zhao, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 621 days.

(21) Appl. No.: 16/014,503

(22) Filed: Jun. 21, 2018

(65) Prior Publication Data
US 2019/0392353 A1 Dec. 26, 2019

(51) Int. Cl.
*G06N 20/00* (2019.01)
(52) U.S. Cl.
CPC .................. *G06N 20/00* (2019.01)
(58) Field of Classification Search
CPC ........ G06N 20/00; G06N 3/0454; G06N 3/08; G06N 5/003
See application file for complete search history.

(56) References Cited

U.S. PATENT DOCUMENTS 8,438,120 B2  5/2013 Raajimakers
9,838,847 B2  12/2017 Julian et al.
10,360,517 B2* 7/2019 Koch ..................... G06N 20/10

OTHER PUBLICATIONS

H. Tamano, S. Nakadai and T. Araki, "Optimizing Multiple Machine Learning Jobs on MapReduce," 2011 IEEE Third International Conference on Cloud Computing Technology and Science, Athens, 2011, pp. 59-66, doi: 10.1109/CloudCom.2011.18. (Year: 2011).*
B. Panda, J. S. Herbach, S. Basu, and R. J. Bayardo. Planet: Massively Parallel Learning of Tree ensembles with Mapreduce. Proceeding of VLDB Endowment, 2(2):1426-1437, Aug. 2009. (Year: 2009).*
Tomasz Nykiel, Michalis Potamias, Chaitanya Mishra, George Kollios, and Nick Koudas. 2010. MRShare: sharing across multiple queries in MapReduce. Proc. VLDB Endow. 3, 1-2 (Sep. 2010), 494-505. DOI:https://doi.org/10.14778/1920841.1920906 (Year: 2010).*
Chen, Rong, and Haibo Chen. "Tiled-mapreduce: Efficient and flexible mapreduce processing on multicore with tiling." ACM Transactions on Architecture and Code Optimization (TACO) 10.1 (2013): 1-30. https://dl.acm.org/doi/pdf/10.1145/2445572.2445575 (Year: 2013).*

(Continued)

*Primary Examiner* — Eric Nilsson
*Assistant Examiner* — Michael H Hoang
(74) *Attorney, Agent, or Firm* — Griffiths & Seaton PLLC

(57) ABSTRACT

Embodiments for efficient machine and deep learning hyperparameter tuning in a distributed computing system. Runtime metrics of each training iteration are collected to identify candidate jobs to merge during an execution phase. The candidate jobs are grouped into job groups, and the job groups containing the candidate jobs are merged together subsequent to each iteration boundary for execution during the execution phase.

15 Claims, 11 Drawing Sheets

(56) References Cited

OTHER PUBLICATIONS

Kotthaus, Helena, et al. "Rambo: Resource-aware model-based optimization with scheduling for heterogeneous runtimes and a comparison with asynchronous model-based optimization." International Conference on Learning and Intelligent Optimization. Springer, Cham, 2017. (Year: 2017).*

[Item V continued] https://link.springer.com/content/pdf/10.1007%2F978-3-319-69404-7_13.pdf.*

Zhang, Hao, et al. "Poseidon: An efficient communication architecture for distributed deep learning on {GPU} clusters." 2017 USENIX Annual Technical Conference (USENIX ATC 17). 2017. https://www.usenix.org/conference/atc17/technical-sessions/presentation/zhang (Year: 2017).*

Campos, Victor, et al. "Distributed training strategies fora computer vision deep learning algorithm on a distributed GPU cluster." Procedia Computer Science 108 (2017): 315-324. https://www.sciencedirect.com/science/article/pii/S1877050917306129 (Year: 2017).*

Reuther, Albert, et al. "Scheduler technologies in support of high performance data analysis." 2016 IEEE High Performance Extreme Computing Conference (HPEC). IEEE, 2016. https://ieeexplore.ieee.org/stamp/stamp.jsp?tp=&arnumber=7761604 (Year: 2016).*

Domham et al., "Speeding Up Automatic Hyperparameter Optimization of Deep Neural Networks by Extrapolation of Learning Curves," Proceedings of the Twenty-Fourth International Joint Conference on Artificial Intelligence (IJCAI 2015), 2015 (9 pages).

Bardenet et al., "Collaborative hyperparameter tuning," International Conference on Machine Learning, 2013 (9 pages).

Bergstra et al., "Random Search for Hyper-Parameter Optimization," Journal of Machine Learning Research 13 (2012), 2012 (25 pages).

Bergstra et al., "Algorithms for Hyper-Parameter Optimization," Advances in neural information processing systems, 2011 (9 pages).

Raschka, "Model Evaluation, Model Selection, and Algorithm Selection in Machine Learning," 2018 (33 pages).

* cited by examiner

400

| TUNING RESULT | TUNING PARAMETERS |
|---|---|

| LEARNING RATE: | 0.11280567 |
| MOMENTUM: | 0 |
| WEIGHT DECAY: | 0.20413527 |
| HIDDEN T STAT SIZE (RNN): | |
| OPTIMIZER: | ADAGRAD |
| BATCHSIZE: | 64 |

| NAME | DESCRIPTION | TYPE | MIN | MAX |
|---|---|---|---|---|
| BATCH_SIZE | SGD PARAMETER | INT | 8 | 32 |
| CONV_1_FILTER_SIZE | ARCHITECTURE PARAMETER | INT | 2 | 10 |
| CONV_1_NUM-FILTERS | ARCHITECTURE PARAMETER | INT | 32 | 256 |
| CONV_2_FILTER_SIZE | ARCHITECTURE PARAMETER | INT | 2 | 10 |
| CONV_2_NUM-FILTERS | ARCHITECTURE PARAMETER | INT | 32 | 256 |
| CONV_3_FILTER_SIZE | ARCHITECTURE PARAMETER | INT | 2 | 10 |
| CONV_3_NUM-FILTERS | ARCHITECTURE PARAMETER | INT | 32 | 256 |
| LOG_BETA_1 | ADAM SGD PARAMETER | REAL | -4.6 | -0.7 |
| LOG_BETA_2 | ADAM SGD PARAMETER | REAL | -13.8 | -0.7 |
| LOG_DECAY | ADAM SGD PARAMETER | REAL | -23 | -2.3 |
| LOG_EPSILON | ADAM SGD PARAMETER | REAL | -23 | -13.8 |
| LOG_LR | ADAM SGD PARAMETER | REAL | -23 | 0 |

FIG. 4

JOB MERGING FOR MACHINE AND DEEP LEARNING HYPERPARAMETER TUNING

BACKGROUND OF THE INVENTION

Field of the Invention

The present invention relates in general to computing systems, and more particularly, to various embodiments for grouping and merging jobs for deep and machine learning hyperparameter tuning in distributed computing environments.

Description of the Related Art

In today's interconnected and complex society, computers and computer-driven equipment are more commonplace. When performing compute-intensive workloads such as data analytics, an effective framework involves distributed parallel computing, which operates to disperse processing tasks across multiple processors operating on one or more computing devices such that parallel processing may be executed simultaneously. One example of parallel computing involves machine and deep learning. Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics.

SUMMARY OF THE INVENTION

Various embodiments for efficient machine and deep learning hyperparameter tuning in a distributed computing system are provided. In one embodiment, a method comprises (a) collecting runtime metrics of each training iteration to identify candidate jobs to merge during an execution phase; (b) grouping the candidate jobs into job groups; and (c) merging the job groups containing the candidate jobs together subsequent to each iteration boundary for execution during the execution phase.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a block diagram depicting an exemplary hyperparameter search, in accordance with aspects of the present invention;

DETAILED DESCRIPTION OF THE DRAWINGS

Figure 1:
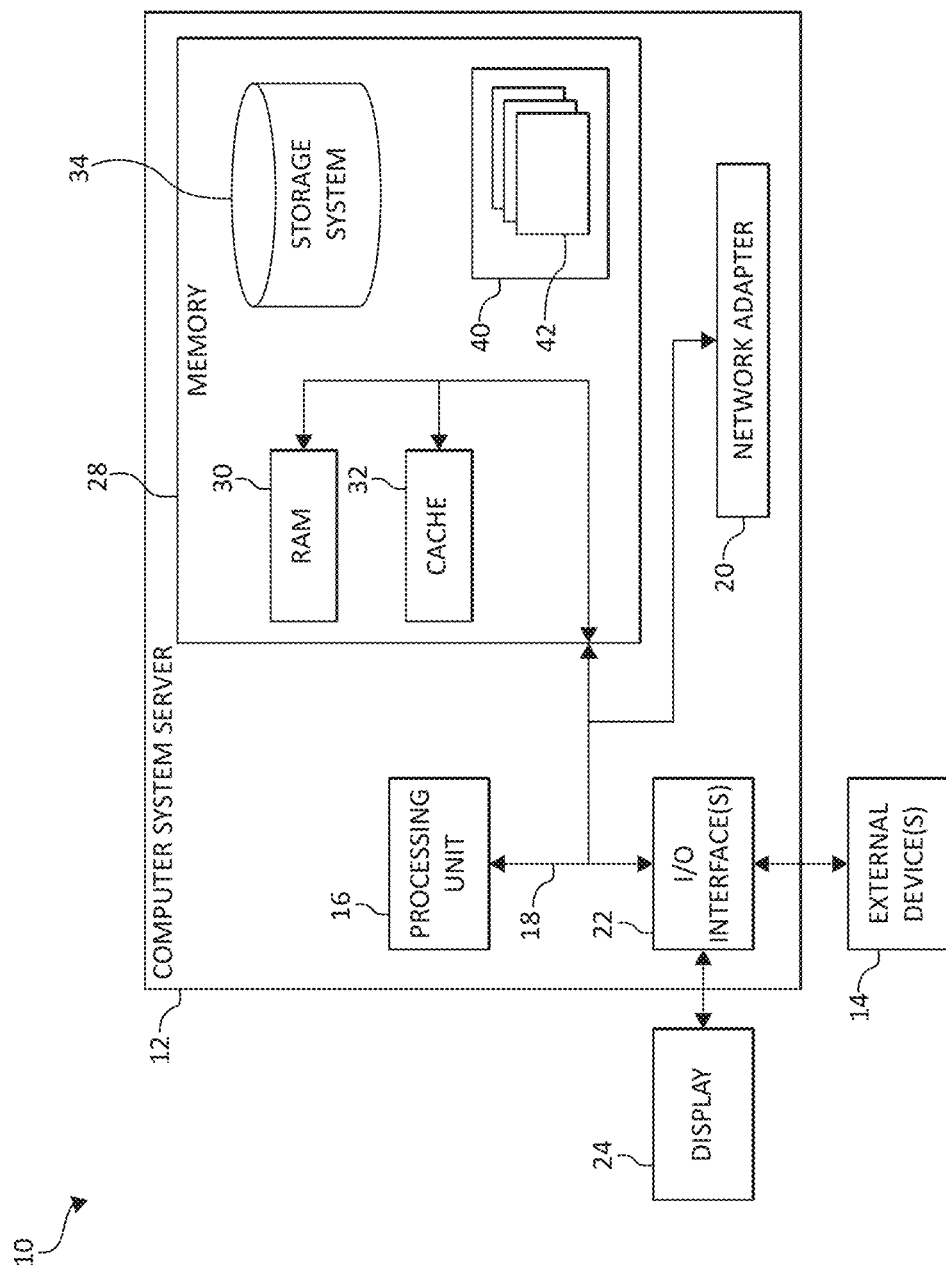
FIG. 1 is a block diagram depicting an exemplary computing node according, to embodiments of the present invention.

As aforementioned, when performing compute-intensive workloads such as data analytics and deep learning, an effective framework involves distributed parallel computing, which operates to disperse processing tasks across multiple processors (or preferably hardware accelerators) operating on one or more computing devices such that parallel processing may be executed simultaneously.

Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics. Data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages. During a processing stage, learner units can independently generate data based on input data and/or previously learned data and such information can be gathered by a centralized entity or otherwise passed on to a global model for distribution to the other learners.

Prior to beginning this training process and when working with neural networks and machine learning pipelines, several free configuration parameters exist which are required to be input manually (e.g., by a user) prior to a model of the process being fitted. These configuration parameters are known as "hyperparameters", and the input choice of hyperparameter configurations can greatly impact the difference between poor and superior predictive performance of the model. It should be noted that training convergence is particularly sensitive to hyperparameter inputs, and also that hyperparameter optimization techniques exist such methods as grid search, random search, manual tuning, and tree-structured parzen estimators (TPE) algorithms. Using these optimization techniques, the hyperparameter search normally searches in the hyperparameter space in attempt to locate the best parameter fit for the particular model. Some features of this optimization include a parallel run of the same type of training jobs, a more accurate convergence rate, retrieving a next set of searching jobs to execute, etc. The (optimized) hyperparameter search is concluded upon determining a certain accuracy of parameters, finishing a target number of searching jobs, or finishing within a target time boundary; and the resulting output comprises a set of hyperparameters which meets a best accuracy within the search history.

In view of the aforementioned optimization algorithms, it would be advantageous, in order to more effectively run the search job, to reduce the search spaces through the hyperparameter search algorithm (e.g., Gauss Process, Bayes Analysis, TPE, Random Search, etc.) from which the optimized hyperparameters are identified. However, several factors mitigate this reduction from easily being performed. First, the search spaces themselves are generally vast and multi-dimensional, and it is a common trade-off between an amount of time required and a resource cost to find the best matched parameter within the search space. Second, search jobs execute exactly the same job time after time using the same input dataset and model. Only the parameters such as learning rate and optimization configurations are different between jobs. Finally, the job executor overhead is quite large because of job submission overhead, scheduling, and resource sharing limitations between search jobs. While some prior art implementations use a fixed number of accelerators (i.e., graphical processing units (GPUs) or field-programmable gate arrays (FPGAs), etc.) and optimization algorithms, they often continue to rely on user-expertise to adjust training parameters or other user specified information to obtain search parameter sets with varying degrees of outcomes.

Accordingly, the present invention introduces novel techniques for increasing the efficiency of hyperparameter searching and tuning by leveraging runtime metrics of a training dataset of each training iteration executed thereof to identify job groups which may be efficiently merged during an execution phase of the search process. The runtime metrics are cached during each of a plurality of iterations performed and include, as part of the metrics, algorithms to collect the model size and input dataset of each training iteration. In some embodiments, a set of test iterations may be performed to acquire these statistics.

Once the runtime metrics have been collected and analyzed, tasks (search jobs) can be dynamically identified to determine which of the jobs in the group or group of jobs themselves may be merged for execution on the same accelerator device. This merger process includes sharing, by a session scheduler for the jobs, a backlog of hyperparameters within the job group, and grouping the runtime job proposal of candidate tasks or jobs. Further, an execution engine may be employed to generate an equivalence model pipeline for the runtime jobs, optimize a calculation or model graph thereof, and compute merge requests triggered by the scheduler. By performing these actions, the overhead the cluster needs to run many jobs for the same model is reduced, and further reduced is the overhead associated with job spawning and task scheduling for these jobs. Moreover, the merging process benefits from allowing the hyperparameter search jobs to conclude more efficiently on limited hardware by dynamically grouping the hyperparameter search jobs into a single job. In response, a user may execute the search jobs over a larger search space or run additional search jobs in certain hardware and/or time boundaries.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
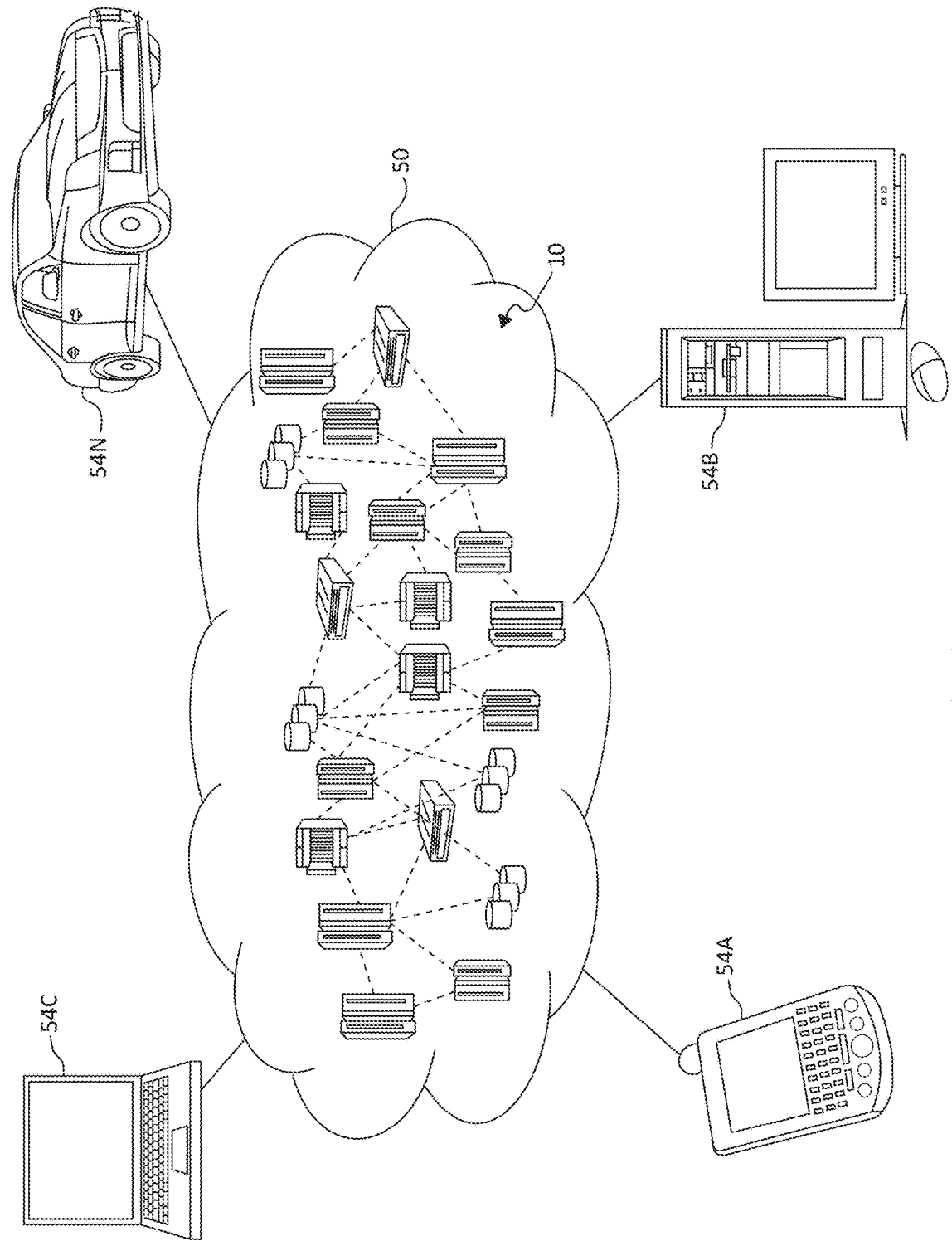
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
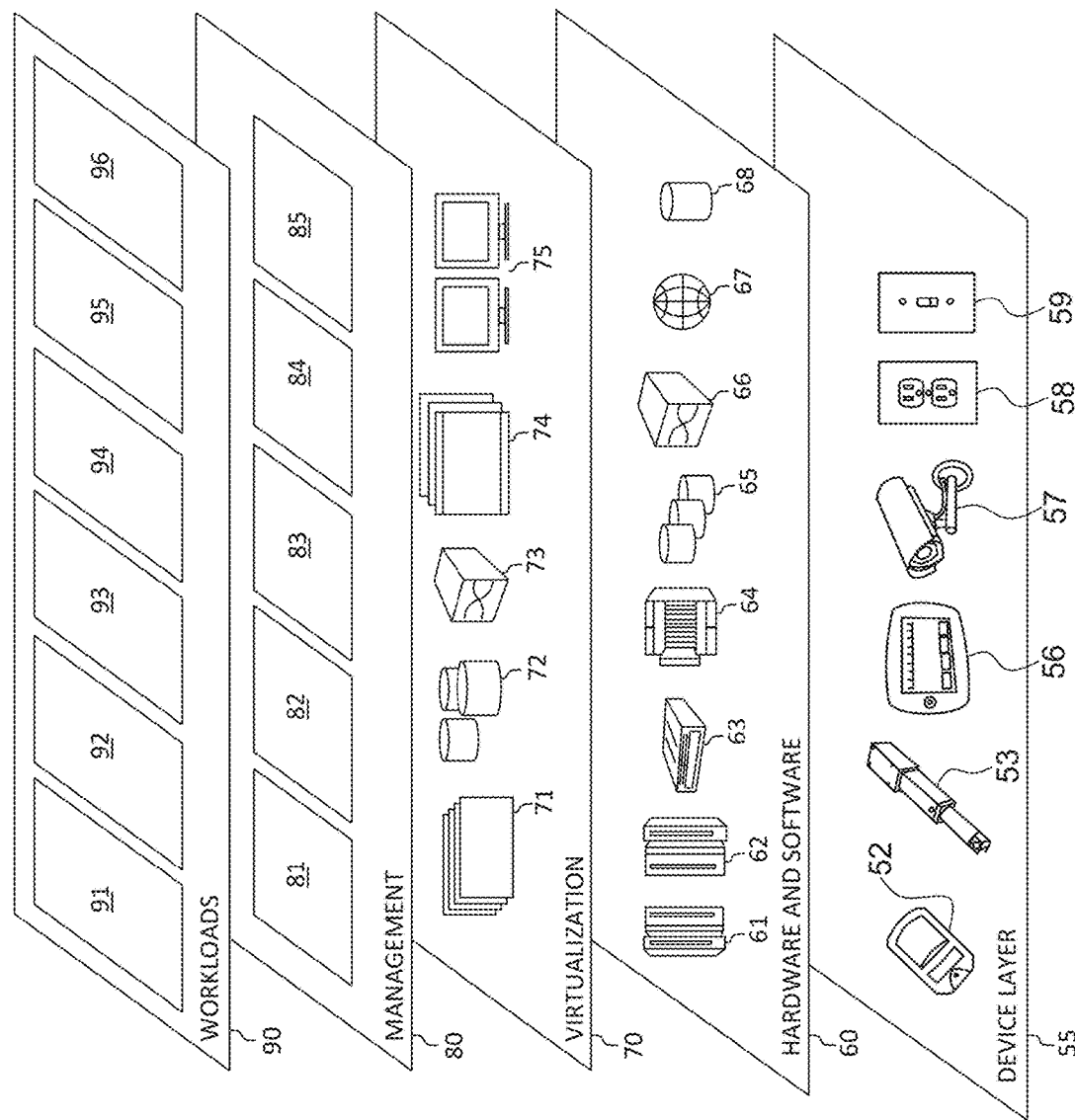
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, hand-held scanner 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning and large-scale data processing workloads and functions 96.

Optimized Hyperparameter Searching by Merging of Tasks

Embodiments described herein include techniques facilitating the dynamic merging of hyperparameter search jobs to execute concurrently on each one of a plurality of accelerator devices (i.e., GPUs, FGPAs, etc.). This functionality may be described as a system using two separate components, namely, a grouping plan generator and an execution engine. Further, the use of a scheduler may be implemented to share certain job characteristics and triggering of the merge process, as will be described. It should be noted that the functionality of the grouping plan generator, execution engine, and the scheduler may be individually or collectively performed within a given set of software or firmware within respective portions of the clustered computing environment as previously described in FIG. 1-3.

Referring now to FIG. 4, an exemplary (concluded) hyperparameter search 400 is depicted illustrating various hyperparameter sets optimized during the search phase. As aforementioned, hyperparameters are configuration parameters which are external to a given data model and whose value cannot be estimated from the input data, and thus, optimization techniques may be used to search these parameters in order to best fit the given data model. The depicted hyperparameter search 400 illustrates a tuning result phase concluded upon performing the search over a certain search space (using a particular algorithm and tuning parameters). As shown, the hyperparameter search 400 allows tuning parameters to be input (not depicted) and optimized sets of hyperparameters to be output for conducting further training on a given model. In the depicted search 400, several configuration parameters are used such as a batch size, optimizer algorithm, etc. which "tunes" the parameters according to the specific tuning process implemented.

Grouping Plan Generator

Figure 5:
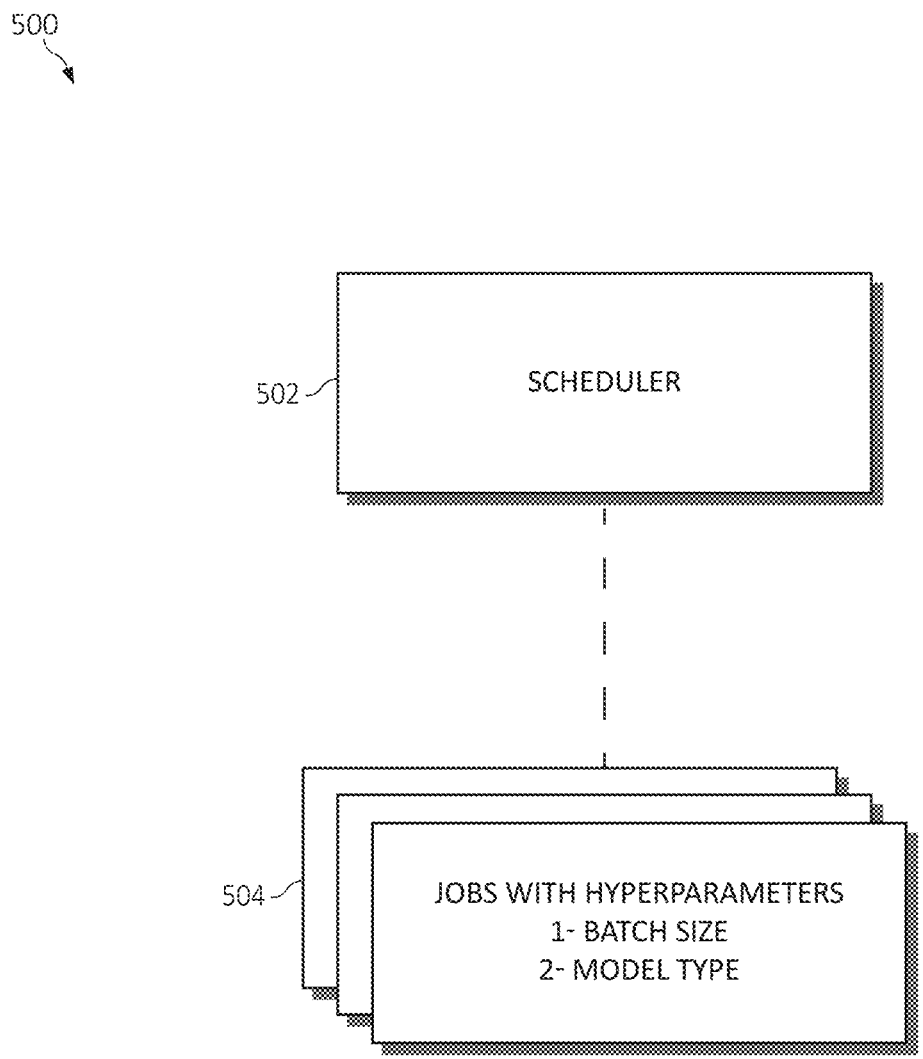
FIG. 5 is a graph diagram depicting a grouping of jobs for scheduling, in accordance with aspects of the present invention.

The grouping plan generator performs several functions related to the collection of runtime metrics during each training iteration and grouping of candidate jobs for merged execution on each of a plurality of accelerator devices. Referring now to the hyperparameter job backlog 500 of FIG. 5, first, the grouping plan generator may collect or determine a physical GPU memory size of each accelerator device of the cluster. Next, the grouping plan generator may collect or retrieve, from the scheduler 502, job requests for hyperparameter search (where the job requests are collectively referenced as jobs with hyperparameters 504). Subsequent to the retrieval of the job requests, the grouping plan generator may group the job requests 504 according to the training dataset associated with each job, according to model type parameters specified with each job, and/or according to a batch size and a particular dataset associated with each job. That is, the job requests 504 may be grouped according to a similar model type parameter or the job requests 504 may be grouped according to differing model type parameters in order of a certain defined priority. Similarly, the job requests 504 may be grouped according to a similar sized batch size and particular dataset type or the job requests 504 may be grouped in order of an ascending or descending batch and dataset, etc.

Upon determining the job requests 504 for hyperparameter searches and grouping the job requests 504 according to one or more of the criteria previously discussed, a memory footprint (i.e., a runtime metric) is identified for each training iteration of each job. The memory footprint is collected by determining an in-GPU memory cost for each iteration corresponding to a particular job having a given dataset and batch size. The memory footprint may therefore be expressed as: $Cost(1)=Iteration(d1,m1,b1)+Batch(i)$, where d is the dataset, b is the batch size, and m is the model type parameter. In short, the grouping plan generator attempts to determine how much in-GPU memory for a particular accelerator device is used during each iteration for a given job with its attendant batch and dataset, and model type configuration parameters. Subsequent to identifying and collecting (caching) the memory footprint for each iteration, the job requests 504 may be sorted in order of their size of search in other given parameter dimensions to ensure the coverage on a certain parameter is provided in random style.

Figure 6:
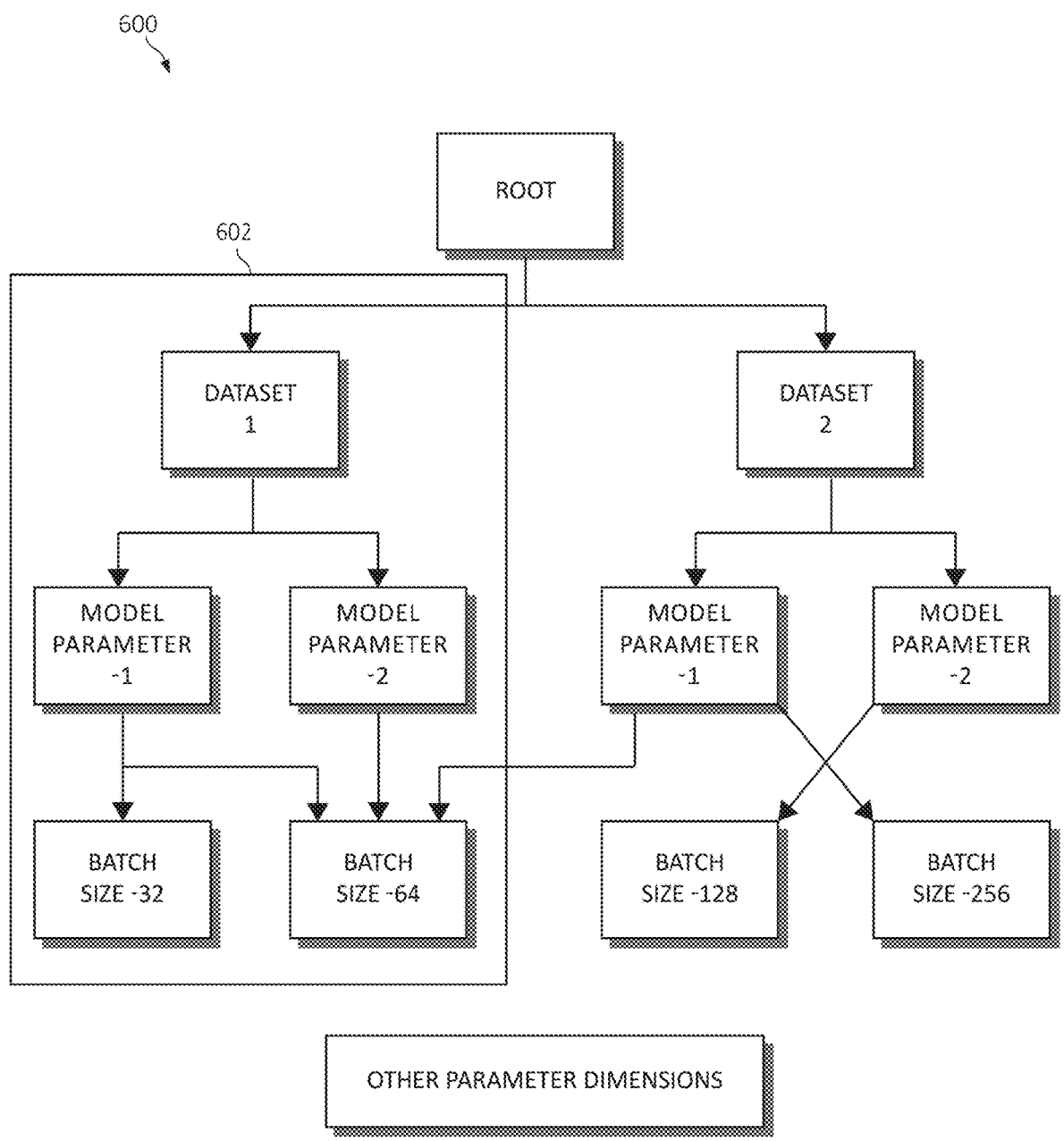
FIG. 6 is a graph diagram depicting a proposed generation of the grouped jobs defined as a tree structure, in accordance with aspects of the present invention.

In various embodiments, the grouping plan generator, subsequent to collecting and caching the runtime metrics for each training iteration, may then generate a proposed combination or grouping of jobs. As illustrated in FIG. 6, the proposed combination of jobs 602 may be grouped in a tree structure 600 wherein the tree structure of the combination or grouping plan is organized based on the particular dataset associated with the jobs and the model or batch size of respective jobs within the group. That is, and referencing tree structure 600, those jobs associated with a particular dataset and a similar model or batch size are organized into the proposed combination of jobs 602. This combination 602 is based on reducing the size of the search space of the given jobs at a particular rate, which may be expressed (in accordance with variables referenced in the previous computation) as: $Rate(i)=Cost(di, mi, bi)/GPUMemory$. In some cases, the cost may outweigh the rate, such that, for example, if the Rate(i) is above 90 percent, the particular job is not joined into the combination of jobs 602. Further, as part of the proposed combination, the memory footprint of the candidate jobs are combined, where $Rate(i)=Batch(i)+Iteration(di, mi, bi)$.

Execution Engine

Figure 7:
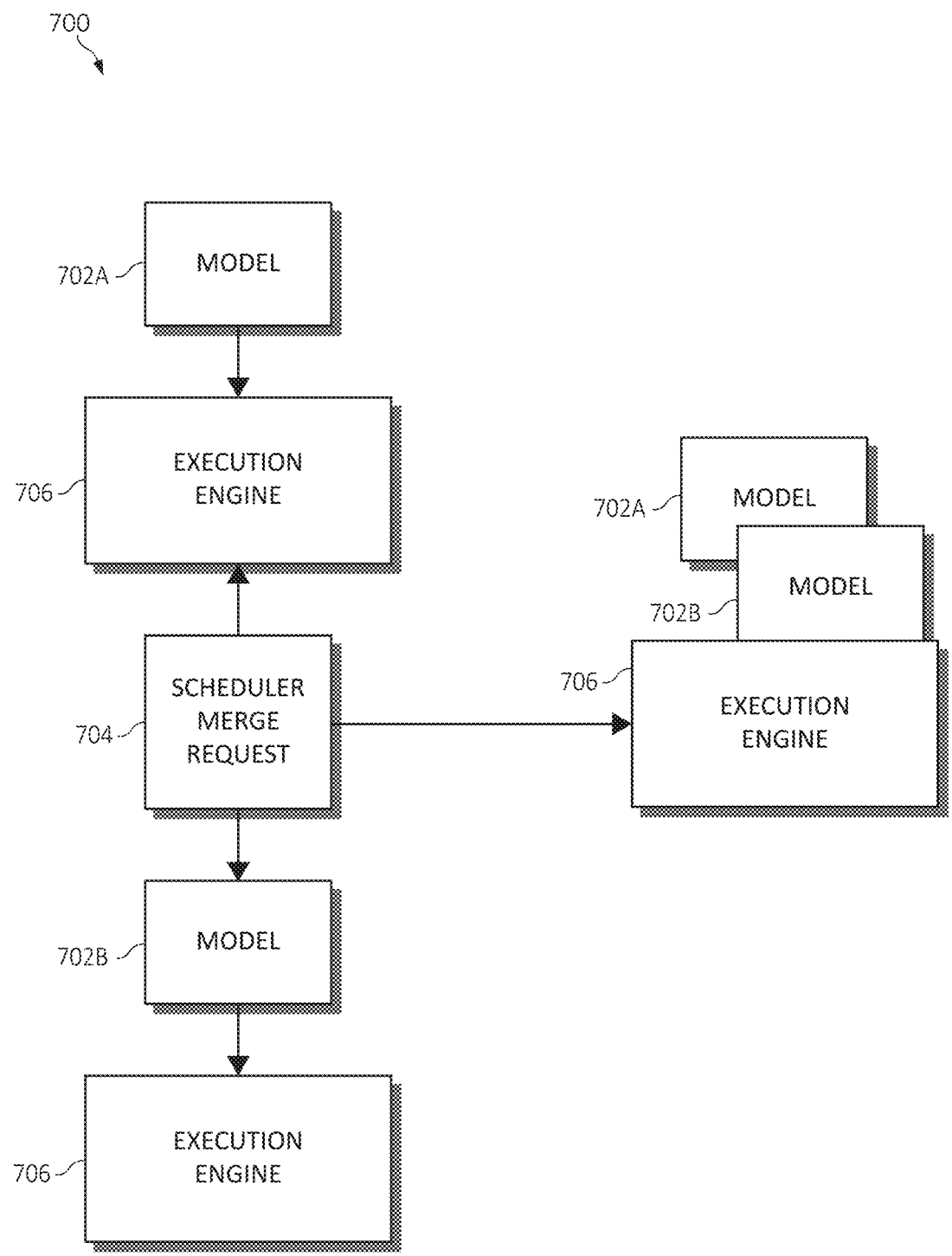
FIG. 7 is a graph diagram depicting a system for merging the grouped jobs for execution, in accordance with aspects of the present invention.

In various embodiments, subsequent to the grouping plan generator identifying job candidates and grouping the candidates into proposed combinations of jobs to be merged, the execution engine dynamically combines the models after each training iteration boundary. Referring now to the merge model 700 of FIG. 7, the scheduler 502 determines a backlog of hyperparameter jobs exist which may be merged together for execution, and triggers a merge request 704. Once the merge request 702 has been triggered by the scheduler 502, the execution engine 706 dynamically combines the models 702A and 702B for execution concurrently (represented on the right side of merge model 700) in lieu of processing each search request individually (represented on the left side of merge model 700). This process is also used to add a new model pipeline parallelly executed to the existing models 702A and 702B.

Figure 8A:
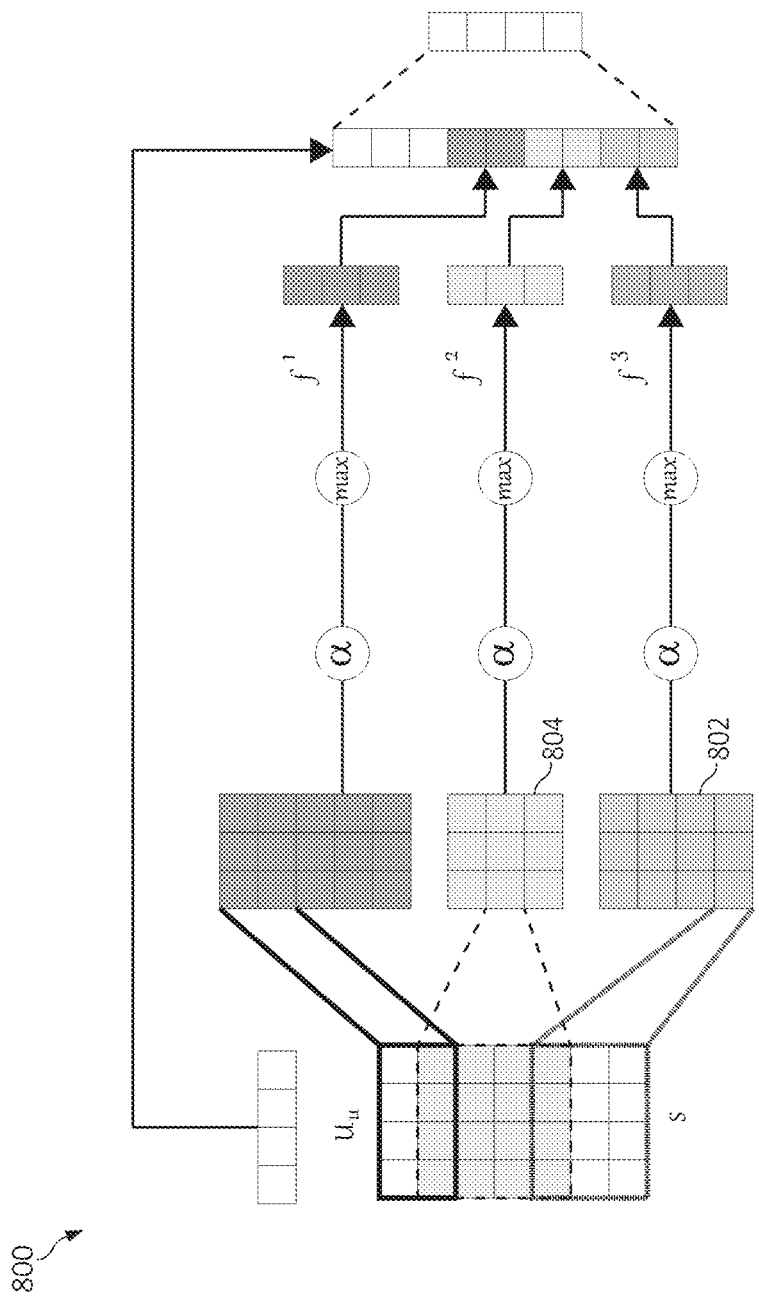
FIG. 8A-8B are graph diagrams depicting a model merge proposal of respective calculation graphs, in accordance with aspects of the present invention.
Figure 8B:
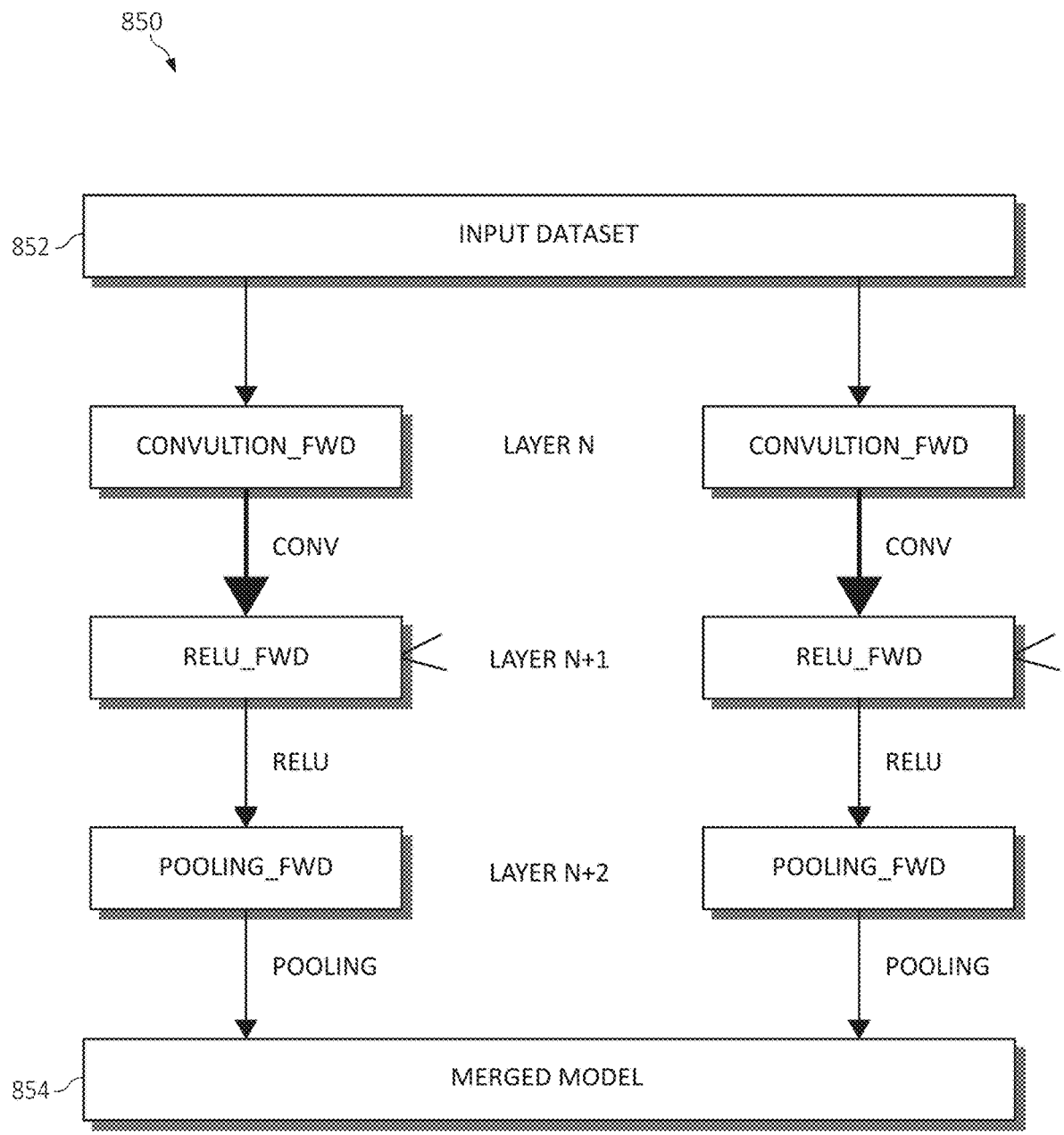

The execution engine 706 dynamically combines the proposed merge model as follows. It should be noted that the machine/deep learning model essentially represents a calculation or model graph within the execution engine 706. Thus, when combining the proposed merge model, the merge model inherently adds a parallel calculation or model graph into the execution engine. Two examples of these models are depicted in the model 800 of FIG. 8A and the merged graph 850 of FIG. 8B. In the model 800, for example, 802 and 804 reference the parallel model added onto the same accelerator device (e.g., GPU), as 802 and 804 may deal with two separated training parameters yet execute within the same accelerator. In the merged graph 850, the input dataset 852 undergoes a model merge process to parallelly add a model graph to obtained a merged model 854, which model graph is then optimized according to a defined algorithm.

Figure 9:
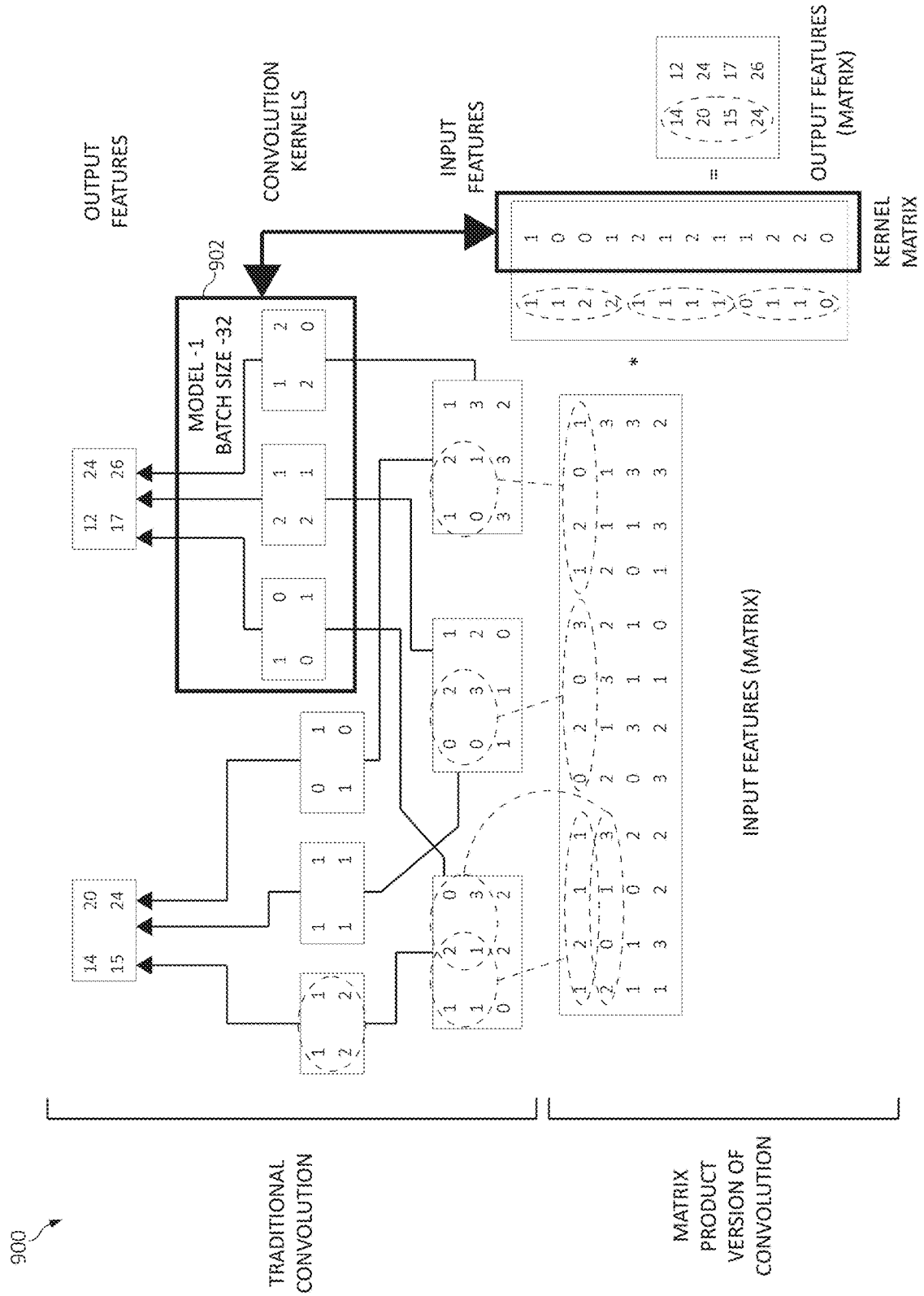
FIG. 9 is a graph diagram depicting an exemplary merged convolutional neural network (CNN) node, in accordance with aspects of the present invention.

Upon adding the parallel graph within the execution engine 706, the model graph may be optimized, as many nodes of the graph may be merged as one operation with an enlarged tensor. In some situations, however, such as when using batch normalization nodes, the statistical data of the tensor distribution is needed and the model graph is not able to be merged. To compute the model merge proposal, the execution engine 706 performs an algorithmic calculation where $Batch(i)+Iteration(di, mi, bi)$ is used to reverse visit the calculation/model graph to compute the cost of overall memory consumption within each accelerator device. This overall memory consumption comprises the operator memory cost added to the tensor size in each operator. Once the proposed merge model is implemented by the execution engine 706, the nodes of the model/calculation graph may be merged as depicted in the exemplary merged node 902 (showing the merged convolution kernels and kernel matrix) of the CNN node 900 of FIG. 9.

Figure 10:
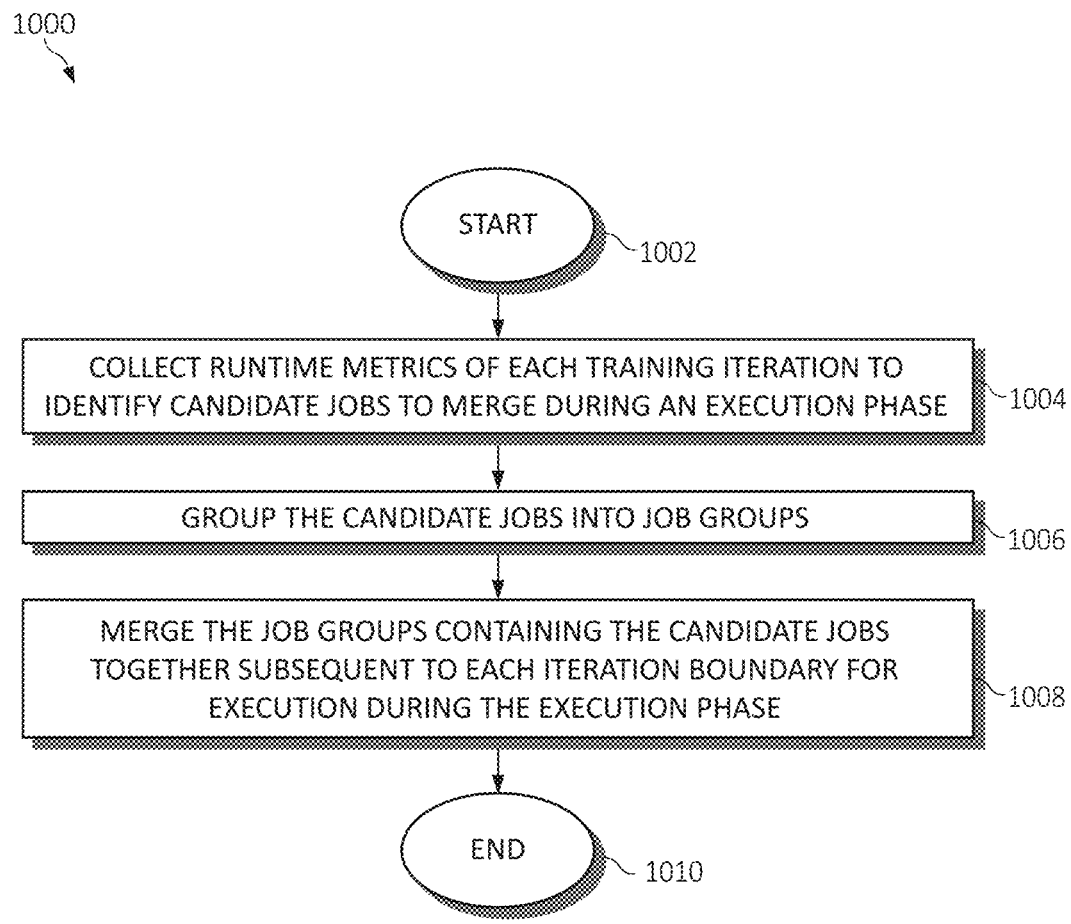
FIG. 10 is a flowchart diagram of an exemplary method for efficient machine and deep learning hyperparameter tuning in a distributed computing system, in accordance with aspects of the present invention.

Forming an overview of this functionality, FIG. 10 is a flowchart diagram of an exemplary method 1000 for efficient machine and deep learning hyperparameter tuning in a distributed computing system. Each of the steps of the method 1000 may be performed by any suitable component of the operating environment. For example, in various embodiments, the method 1000 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 1000 begins (step 1002) by collecting runtime metrics of each of a plurality of training iterations to identify candidate jobs to merge during an execution phase (step 1004). Subsequent to recording the metrics, the candidate jobs are grouped into job groups (step 1006), and the job groups containing the candidate jobs are merged together subsequent to each iteration boundary for execution during the execution phase (step 1008). The method 1000 ends (step 1010). To wit, the method 1000 includes a grouping plan generator to record and cache runtime metrics of hyperparameter jobs as designated by a scheduler based on a training dataset and model for each hyperparameter search. The training iteration footprint for each training job is collected and the potential jobs are grouped into a tree structure, where proposed merge candidates are sorted. An execution then merges the jobs together for execution on each accelerator device to improve accelerator memory utilization, more effectively conclude the parameter search, and reduce scheduler overhead in large cluster training sessions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for efficient machine and deep learning hyperparameter tuning in a distributed computing system, by a processor, comprising:
    collecting runtime metrics of each of a plurality of training iterations to identify candidate jobs to merge during an execution phase, wherein the candidate jobs comprise hyperparameter search jobs based on a training dataset;
    identifying the candidate jobs based on the collected runtime metrics according to a computed memory footprint identified for each current and previous training iteration of the plurality of training iterations of each of the candidate jobs, wherein the memory footprint is computed, for a given job of the candidate jobs and for a given iteration of the plurality of training iterations, by determining an in-graphical processing unit (in-GPU) memory consumption estimated to be required of a particular accelerator device executing the given job, and wherein determining the in-GPU memory consumption comprises computing a memory cost for the given job for the given iteration as a function of the training dataset, batch size, and model type configuration parameters of the given job;
    grouping the candidate jobs into job groups, wherein the candidate jobs are initially grouped into the job groups according to the collected runtime metrics determined during the plurality of training iterations; and
    merging the job groups containing the candidate jobs together prior to executing the candidate jobs during the execution phase, wherein the merging of the job groups is performed within an execution engine upon receiving a merge request triggered by a scheduler determining a backlog of hyperparameter search jobs exist; and wherein the merging of the job groups for execution is performed for each of a plurality of accelerator devices, inclusive of the particular accelerator device, performing the execution.

2. The method of claim 1, further including caching the runtime metrics, the runtime metrics including at least a model size and an input dataset associated with the training dataset.

3. The method of claim 2, further including, pursuant to identifying the candidate jobs:
    collecting a physical memory size of each of the plurality of accelerator devices;
    grouping job requests according to at least one of a model parameter, the model size, and the input dataset; and
    using the model size and input dataset to compute the memory footprint for each training iteration.

4. The method of claim 3, wherein grouping the job groups further includes grouping the candidate jobs in a tree structure, the tree structure organized based on the input dataset and the model size.

5. The method of claim 1, wherein performing the merging, by the execution engine, further includes optimizing a model graph associated with the job groups including computing the merge request associated with the model graph to determine a cost of overall memory consumption.

6. A system for efficient machine and deep learning hyperparameter tuning in a distributed computing system, comprising:
    a processor executing instructions stored in a memory device; wherein the processor:
        collects runtime metrics of each of a plurality of training iterations to identify candidate jobs to merge during an execution phase, wherein the candidate jobs comprise hyperparameter search jobs based on a training dataset;
        identify the candidate jobs based on the collected runtime metrics according to a computed memory footprint identified for each current and previous training iteration of the plurality of training iterations of each of the candidate jobs, wherein the memory footprint is computed, for a given job of the candidate jobs and for a given iteration of the plurality of training iterations, by determining an in-graphical processing unit (in-GPU) memory consumption estimated to be required of a particular accelerator device executing the given job, and wherein determining the in-GPU memory consumption comprises computing a memory cost for the given job for the given iteration as a function of the training dataset, batch size, and model type configuration parameters of the given job;
        groups the candidate jobs into job groups, wherein the candidate jobs are initially grouped into the job groups according to the collected runtime metrics determined during the plurality of training iterations; and
        merges the job groups containing the candidate jobs together prior to executing the candidate jobs during the execution phase, wherein the merging of the job groups is performed within an execution engine upon receiving a merge request triggered by a scheduler determining a backlog of hyperparameter search jobs exist; and wherein the merging of the job groups for execution is performed for each of a plurality of accelerator devices, inclusive of the particular accelerator device, performing the execution.

7. The system of claim 6, wherein the processor caches the runtime metrics, the runtime metrics including at least a model size and an input dataset associated with the training dataset.

8. The system of claim 7, wherein the processor, pursuant to identifying the candidate jobs:
    collects a physical memory size of each of the plurality of accelerator devices;
    groups job requests according to at least one of a model parameter, the model size, and the input dataset; and
    uses the model size and input dataset to compute the memory footprint for each training iteration.

9. The system of claim 8, wherein grouping the job groups further includes grouping the candidate jobs in a tree structure, the tree structure organized based on the input dataset and the model size.

10. The system of claim 6, wherein performing the merging, by the execution engine, further includes optimizing a model graph associated with the job groups including computing the merge request associated with the model graph to determine a cost of overall memory consumption.

11. A computer program product for efficient machine and deep learning hyperparameter tuning in a distributed computing system, by a processor, the computer program product embodied on a non-transitory computer-readable storage medium having computer-readable program code portions stored therein, the computer-readable program code portions comprising:

an executable portion that collects runtime metrics of each of a plurality of training iterations to identify candidate jobs to merge during an execution phase, wherein the candidate jobs comprise hyperparameter search jobs based on a training dataset;

an executable portion that identifies the candidate jobs based on the collected runtime metrics according to a computed memory footprint identified for each current and previous training iteration of the plurality of training iterations of each of the candidate jobs, wherein the memory footprint is computed, for a given job of the candidate jobs and for a given iteration of the plurality of training iterations, by determining an in-graphical processing unit (in-GPU) memory consumption estimated to be required of a particular accelerator device executing the given job, and wherein determining the in-GPU memory consumption comprises computing a memory cost for the given job for the given iteration as a function of the training dataset, batch size, and model type configuration parameters of the given job;

an executable portion that groups the candidate jobs into job groups, wherein the candidate jobs are initially grouped into the job groups according to the collected runtime metrics determined during the plurality of training iterations; and an executable portion that merges the job groups containing the candidate jobs together prior to executing the candidate jobs during the execution phase, wherein the merging of the job groups is performed within an execution engine upon receiving a merge request triggered by a scheduler determining a backlog of hyperparameter search jobs exist; and wherein the merging of the job groups for execution is performed for each of a plurality of accelerator devices, inclusive of the particular accelerator device, performing the execution.

12. The computer program product of claim 11, further including an executable portion that caches the runtime metrics, the runtime metrics including at least a model size and an input dataset associated with the training dataset.

13. The computer program product of claim 12, further including an executable portion that, pursuant to identifying the candidate jobs:

collects a physical memory size of each of the plurality of accelerator devices;

groups job requests according to at least one of a model parameter, the model size, and the input dataset; and uses the model size and input dataset to compute the memory footprint for each training iteration.

14. The computer program product of claim 13, wherein grouping the job groups further includes grouping the candidate jobs in a tree structure, the tree structure organized based on the input dataset and the model size.

15. The computer program product of claim 11, wherein performing the merging, by the execution engine, further includes optimizing a model graph associated with the job groups including computing the merge request associated with the model graph to determine a cost of overall memory consumption.

* * * * *